US012020646B2

(12) United States Patent
Gu et al.

(10) Patent No.: US 12,020,646 B2
(45) Date of Patent: Jun. 25, 2024

(54) DISPLAY DEVICE, DRIVING CONTROLLER, AND METHOD OF DRIVING DISPLAY DEVICE

(71) Applicant: Samsung Display Co., Ltd., Yongin-Si (KR)

(72) Inventors: Bon Seog Gu, Yongin-si (KR); Hae Kwan Seo, Yongin-si (KR); Jin Young Roh, Yongin-si (KR); Jae Keun Lim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/139,955

(22) Filed: Apr. 27, 2023

(65) Prior Publication Data

US 2024/0144875 A1 May 2, 2024

(30) Foreign Application Priority Data

Oct. 27, 2022 (KR) ........................ 10-2022-0140689

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/0294* (2013.01); *G09G 2310/08* (2013.01); *G09G 2330/021* (2013.01); *G09G 2340/0435* (2013.01)

(58) Field of Classification Search
CPC ......... G09G 3/3233; G09G 2300/0819; G09G 2310/08; G09G 2330/021; G09G 2340/0435
See application file for complete search history.

(56) References Cited

U.S. PATENT DOCUMENTS

| | | | | |
|---|---|---|---|---|
| 7,553,207 | B2 | 6/2009 | Uhlig et al. | |
| 11,450,251 | B2 | 9/2022 | Seo et al. | |
| 11,580,886 | B2 | 2/2023 | Kwon et al. | |
| 2019/0206329 | A1 | 7/2019 | Lee et al. | |
| 2019/0265560 | A1 * | 8/2019 | Fukami | G02F 1/13471 |

(Continued)

FOREIGN PATENT DOCUMENTS

| | | | |
|---|---|---|---|
| KR | 10-0684951 | B1 | 2/2007 |
| KR | 10-2019-0083393 | A | 7/2019 |

(Continued)

*Primary Examiner* — Sejoon Ahn

(74) *Attorney, Agent, or Firm* — Innovation Counsel LLP

(57) ABSTRACT

A display device is disclosed that includes a pixel component configured to output an image based on a first driving frequency, a scan driver configured to sequentially provide a scan signal to each pixel row in each frame based on the first driving frequency, and a driving controller configured control the scan driver such that, in the case where image data includes data corresponding to a static image, a display area is divided into a first area for the static image, and a second area for a video, and the first area is driven at a second driving frequency, and the second area is driven at a third driving frequency. The driving controller may control the scan driver such that a driving frequency corresponding to the first area is reduced to the second driving frequency, and a driving frequency corresponding to the second area is increased to the third driving frequency.

22 Claims, 12 Drawing Sheets

(56) References Cited

U.S. PATENT DOCUMENTS

| | | | | |
|---|---|---|---|---|
| 2019/0265773 | A1* | 8/2019 | Sjödin | G06F 1/28 |
| 2019/0265835 | A1* | 8/2019 | Shin | G09G 3/3233 |
| 2019/0266943 | A1* | 8/2019 | Gao | G09G 3/3233 |
| 2019/0266947 | A1* | 8/2019 | Zhou | G09G 3/3258 |
| 2019/0267435 | A1* | 8/2019 | Zhou | G09G 3/3225 |
| 2021/0201746 | A1 | 7/2021 | Seo et al. | |

FOREIGN PATENT DOCUMENTS

| | | | |
|---|---|---|---|
| KR | 10-2021-0083470 | A | 7/2021 |
| KR | 10-2022-0001555 | A | 1/2022 |
| KR | 10-2022-0014373 | A | 2/2022 |

* cited by examiner

FIG. 7

| | | |
|---|---|---|
| TARGET DRIVING FREQUENCY | VIDEO DISPLAY AREA | 180Hz |
| | STATIC IMAGE DISPLAY AREA | 60Hz |
| STEP FREQUENCY | | 30Hz |
| DRIVING TIME PER STEP | | 1sec |

DISPLAY DEVICE, DRIVING CONTROLLER, AND METHOD OF DRIVING DISPLAY DEVICE

CROSS-REFERENCE TO RELATED APPLICATION

The present application claims priority to Korean patent application number 10-2022-0140689 filed on, Oct. 27, 2022, the entire disclosure of which is incorporated herein in its entirety by reference.

BACKGROUND

1. Field of Invention

The present disclosure relates to a display device, a driving controller, and a method of driving the display device.

2. Description of Related Art

With the development of information technology, the importance of display devices, which are connection mediums between a user and information, have become more important. Owing to the importance of display devices, the use of various kinds of display devices, such as liquid crystal display devices and organic light emitting display devices, has increased.

SUMMARY

Various embodiments of the present disclosure may be directed to a display device in which, in the case where image data includes a static image, an area provided to display the static image is driven at a low frequency, and an area provided to display a video is driven at a high frequency, so that a high-quality image can be provided to a user.

An embodiment of the present disclosure may provide a display device including: a pixel component configured to output an image refreshed in each frame based on a preset first driving frequency, and including a plurality of pixel rows each including a plurality of pixels; a scan driver configured to sequentially provide a scan signal to each of the plurality of pixel rows in each frame according to the first driving frequency; and a driving controller configured to control the scan driver such that, in the case where image data that is received from an external device and corresponds to a plurality of successive frames includes data corresponding to a static image, a display area included in the pixel component is divided into a first area in which the static image is displayed, and a second area in which a video is displayed, and pixels included in the first area are driven at a second driving frequency less than the first driving frequency, and pixels included in the second area are driven at a third driving frequency greater than the first driving frequency. The driving controller may control the scan driver such that a driving frequency corresponding to the first area is gradually reduced from the first driving frequency to the second driving frequency over a first time period, and a driving frequency corresponding to the second area is gradually increased from the first driving frequency to the third driving frequency over a second time period.

In an embodiment, the driving controller may include: a static image detector configured to check whether the image data includes data corresponding to the static image, and generate, in the case where the image data includes the data corresponding to the static image, region information that is information about regions occupied by the first area and the second area in the pixel component; a frequency determiner configured to determine a driving frequency of each display area in the pixel component, based both on whether the image data includes the data corresponding to the static image and on the region information; and a hold frame determiner configured to set, in the case whether the image data includes the data corresponding to the static image, some of the plurality of frames to hold frames in each of which an image displayed in the first area in a preceding frame is maintained without being refreshed, based on information about the determined frequency.

In an embodiment, the frequency determiner may determine a driving frequency corresponding to an entirety of the display area to be the first driving frequency in the case where the image data does not include the data corresponding to the static image, and may determine, in the case where the image data includes the data corresponding to the static image, the driving frequency corresponding to the first area of the display area to be the second driving frequency, and determines the driving frequency corresponding to the second area to be the third driving frequency.

In an embodiment, the driving controller may control, when gradually reducing the first driving frequency to the second driving frequency, the pixel component and the scan driver such that the first driving frequency is reduced to the second driving frequency by a plurality of steps, and at each of the steps, the display device is driven during a plurality of preset frames at a driving frequency reduced from a driving frequency of a preceding step by a preset step frequency, and may control, when gradually increasing the first driving frequency to the third driving frequency, the pixel component and the scan driver such that the first driving frequency is increased to the third driving frequency by a plurality of steps, and at each of the steps, the display device is driven during the plurality of preset frames at a driving frequency increased from a driving frequency of a preceding step by a preset step frequency. The first time and the second time may be determined depending on a size of the preset step frequency and the number of preset frames.

In an embodiment, each of the hold frames may include a refresh section in which the second area is refreshed, and a hold section in which an image displayed in the first area in a preceding frame is maintained. The scan driver may sequentially provide, in the refresh section, the scan signal to only the pixel rows that correspond to the second area.

In an embodiment, the driving controller may control, when increasing the driving frequency corresponding to the second area from the first driving frequency to the third driving frequency, the pixel component and the scan driver such that the refresh section is allocated to a first sub-frame, the hold section is allocated to a second sub-frame, and successive images are displayed during the first sub-frame and the second sub-frame.

In an embodiment, the scan driver may sequentially provide the scan signal to the pixel rows that correspond to the second area among the plurality of pixel rows during the first sub-frame, and thereafter sequentially provide the scan signal to the pixel rows that correspond to the second area among the plurality of pixel rows during the second sub-frame.

In an embodiment, the display device may further include a data driver configured to provide, through a data line connected to each of a plurality of pixel columns each including a plurality of pixels, a data voltage corresponding to the image data to the plurality of pixels in synchronization with the scan signal in each frame. The data driver may sequentially provide, in the refresh section, the data voltage corresponding to the image data to only the pixels included in the pixel rows that correspond to the second area.

In an embodiment, the display device may further include a data driver configured to provide, through a data line connected to each of a plurality of pixel columns each including a plurality of pixels, a data voltage corresponding to the image data to the plurality of pixels in synchronization with the scan signal in each frame. The driving controller may control the data driver such that a data voltage corresponding to a first image is provided to the pixels included in the second area in the first sub-frame, and control the data driver such that a data voltage corresponding to a second image different from the first image and successive to the first image is provided to the pixels included in the second area in the second sub-frame.

In an embodiment, in a first mode for reducing power consumption of the display device, the hold frame determiner may further set some of the plurality of frames other than the already set hold frames to additional hold frames so that the driving frequency corresponding to the first area is reduced to a value lower than the second driving frequency.

In an embodiment, the driving controller may allocate, in a second mode for high speed driving, the refresh section and the hold section included in at least one hold frame among the additional hold frames to the first sub-frame and the second sub-frame, respectively, so that the driving frequency corresponding to the second area is increased to a value higher than the third driving frequency.

An embodiment of the present disclosure may provide a method of driving a display device for displaying an image refreshed in each frame based on a preset first driving frequency. The method may include: dividing, in the case where image data that is received from an external device and corresponds to a plurality of successive frames includes data corresponding to a static image, a display area included in the display device into a first area in which the static image is displayed, and a second area in which a video is displayed; and driving pixels included in the first area at a second driving frequency less than the first driving frequency, and driving pixels included in the second area at a third driving frequency greater than the first driving frequency. Driving the pixels included in the first area and the pixels included in the second area may include gradually reducing a driving frequency corresponding to the first area from the first driving frequency to the second driving frequency over a first time period, and gradually increasing a driving frequency corresponding the second area from the first driving frequency to the third driving frequency over a second time period.

In an embodiment, the method may further include: checking whether the image data includes data corresponding to the static image; and determining the driving frequency corresponding to the first area to be the second driving frequency, and determining the driving frequency corresponding to the second area to be the third driving frequency. Checking whether the image data includes the data corresponding to the static image may include generating, in the case where the image data includes the data corresponding to the static image, region information that is information about regions occupied by the first area and the second area in the display area. Determining the driving frequency corresponding to the first area and the driving frequency corresponding to the second area may include determining a driving frequency of each display area in a pixel component included in the display device, based both on whether the image data includes the data corresponding to the static image and on the region information.

In an embodiment, the method may further include setting, in the case whether the image data includes the data corresponding to the static image, some of the plurality of frames to hold frames in each of which an image displayed in the first frame in a preceding frame is maintained without being refreshed.

In an embodiment, determining the driving frequency corresponding to the first area and the driving frequency corresponding to the second area may include: determining a driving frequency corresponding to an entirety of the display area to be the first driving frequency in the case where the image data does not include the data corresponding to the static image; and determining, in the case where the image data includes the data corresponding to the static image, the driving frequency corresponding to the first area of the display area to be the second driving frequency, and determining the driving frequency corresponding to the second area to be the third driving frequency.

In an embodiment, the driving frequency corresponding to the first area may be reduced from the first driving frequency to the second driving frequency by a plurality of steps, and at each step included in the plurality of steps, the driving frequency corresponding to the first area may be reduced from a driving frequency determined at a preceding step by a preset step frequency and then be maintained for a preset time. The driving frequency corresponding to the second area may be increased from the first driving frequency to the third driving frequency by a plurality of steps, and at each step included in the plurality of steps, the driving frequency corresponding to the second area may be increased from a driving frequency determined at a preceding step by a preset step frequency and then be maintained for the preset time.

In an embodiment, each of the hold frames may include a fresh section in which the second area is refreshed, and a hold section in which an image displayed in the first area in a preceding frame is maintained. Driving the pixels included in the first area and the pixels included in the second area may further include sequentially providing, to each of a plurality of pixel rows included in the display area and each including a plurality of pixels, a scan signal for driving the pixels included in the display area in each frame based on the first driving frequency. Providing the scan signal may include sequentially providing, in the case where the image data includes the data corresponding to the static image, the scan signal to only the pixel rows that correspond to the second area in each frame in the refresh section.

In an embodiment, driving the pixels included in the first area and the pixels included in the second area may further include driving, when increasing the driving frequency corresponding to the second area from the first driving frequency to the third driving frequency, the pixels included in the first area and the pixels included in the second area such that the refresh section is allocated to a first sub-frame, the hold section is allocated to a second sub-frame, and successive images are displayed during the first sub-frame and the second sub-frame.

In an embodiment, providing the scan signal may include sequentially providing the scan signal to the pixel rows that correspond to the second area among the plurality of pixel rows during the first sub-frame, and then sequentially providing the scan signal to the pixel rows that correspond to the second area among the plurality of pixel rows during the second sub-frame.

In an embodiment, driving the pixels included in the first area and the pixels included in the second area may further include providing, through a data line connected to each of a plurality of pixel columns each including a plurality of pixels, a data voltage corresponding to the image data to the plurality of pixels in synchronization with the scan signal in each frame. Providing the data voltage may include providing a data voltage corresponding to a first image to the pixels included in the second area in the first sub-frame, and providing a data voltage corresponding to a second image different from the first image and successive to the first image to the pixels included in the second area in the second sub-frame.

An embodiment of the present disclosure may provide a driving controller configured to control an operation of driving a display device at a first driving frequency based on image data that is received from an external device and corresponds to a plurality of frames. The driving controller may include a static image detector configured to generate, in the case where the image data includes data corresponding to a static image, region information that is information about regions occupied by a first area and a second area of a display area of the display device, the first area being provided to display the static image, and the second area being provided to display a video; a frequency determiner configured to determine, based on the region information, a driving frequency of the first area to be a second driving frequency lower than the first driving frequency, and determine a driving frequency of the second area to be a third driving frequency higher than the first driving frequency; and a control signal generator configured to generate a control signal for controlling the display device such that, based on the determined frequency information, a driving frequency corresponding to the first area is gradually reduced from the first driving frequency to the second driving frequency over a first time period, and a driving frequency corresponding to the second area is gradually increased from the first driving frequency to the third driving frequency over a second time period.

In an embodiment, the driving controller may further include a hold frame determiner configured to set, based on the determined frequency information, some of the plurality of frames to hold frames in each of which an image displayed in the first area in a preceding frame is maintained without being refreshed.

BRIEF DESCRIPTION OF THE DRAWINGS

FIGS. 7 and 8 are diagrams illustrating a pattern in which hold frames among a plurality of frames are set.

DETAILED DESCRIPTION

Figure 1:
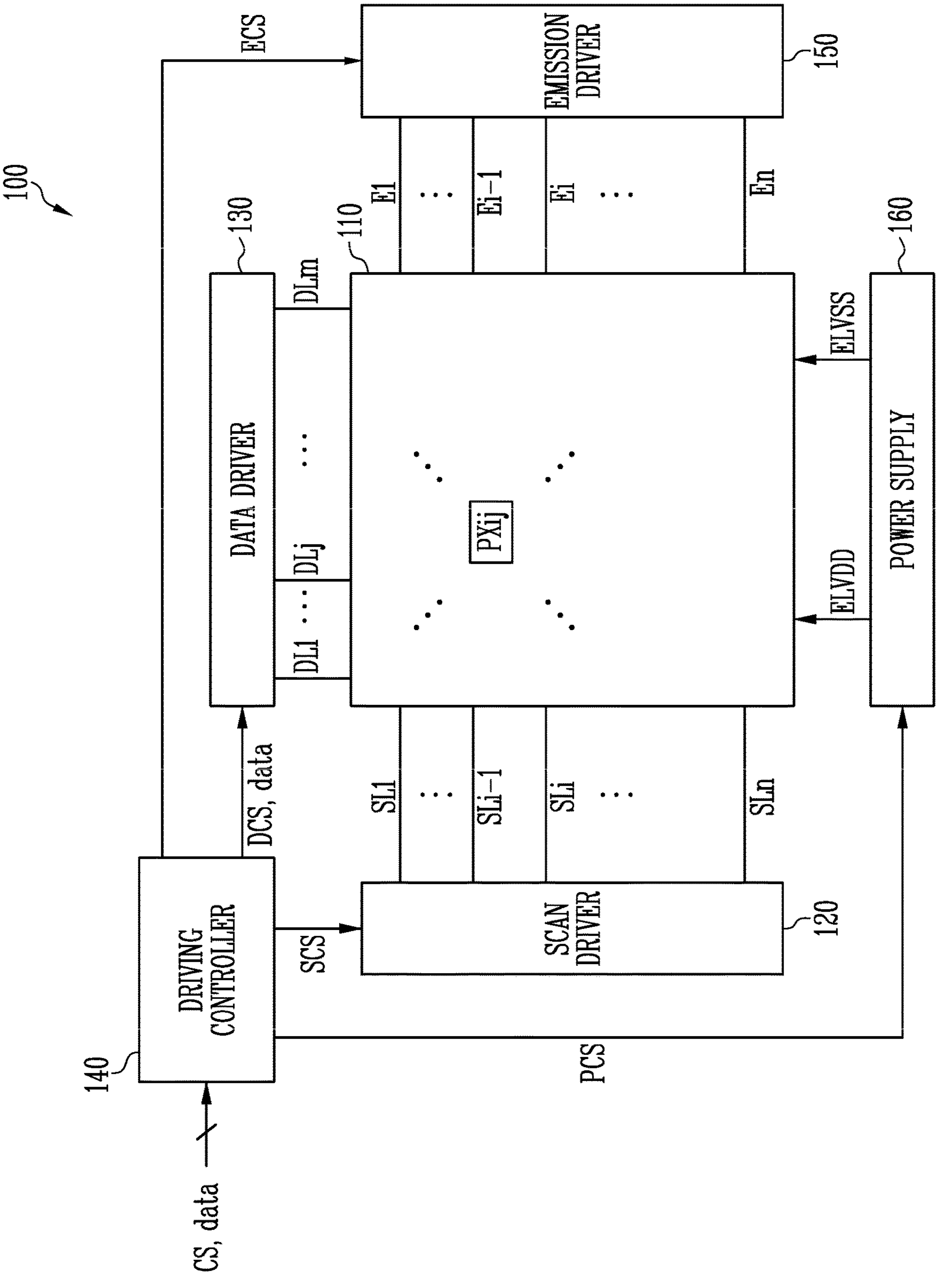
FIG. 1 is a block diagram of a display device in accordance with an embodiment.

Hereinafter, embodiments of the present invention will be described in detail with reference to the attached drawings, such that those skilled in the art can easily implement the present invention. The present disclosure may be embodied in various different forms without being limited to embodiments to be described herein.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which "substantially" has been omitted.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

FIG. 1 is a block diagram of a display device 100 in accordance with an embodiment.

Referring to FIG. 1, the display device 100 in accordance with an embodiment may include a pixel component 110, a scan driver 120, a data driver 130, a driving controller 140, an emission driver 150, and a power supply 160.

The display device 100 may be a flat display device, a flexible display device, a curved display device, a foldable display device, or a bendable display device. Furthermore, the display device 100 may be applied to a transparent display device, a head-mounted display device, a wearable display device, or the like. Furthermore, the display device 100 may be applied to various electronic devices such as a smartphone, a tablet PC, a smart pad, a TV, and a monitor.

The display device 100 may be implemented as an organic light emitting display device, a liquid crystal display device, or the like. However, the foregoing is only for illustrative, and the configuration of the display device 100 is not limited thereto. For example, the display device 100 may be a self emissive display device including an inorganic light emitting element.

The pixel component 110 may include pixels PX connected to data lines DL1 to DLm (where m is a natural number), scan lines SL1 to SLn (where n is a natural number), and emission control lines E1 to En (where n is a natural number). The pixels PX may be supplied with voltages of a first power supply ELVDD and a second power supply ELVSS from an external device.

In an embodiment, a plurality of pixels PX are formed of a plurality of pixel rows which respectively correspond to the scan lines SL1 to SLn or the emission control lines E1 to En. Each of the plurality of pixel rows may include a plurality of pixels.

Although FIG. 1 illustrates n scan lines SL1 to SLn and n emission control lines E1 to En, the present disclosure is not limited thereto. For example, one or more control lines, one or more scan lines, one or more sensing scan lines, or the like may be additionally formed in the pixel component 110 depending on a circuit structure of the pixel PX.

The driving controller 140 may generate a data driving control signal DCS, a scan driving control signal SCS, an emission control signal ECS, and a power driving control signal PCS in response to synchronization signals CS supplied from an external device. Generated from the driving controller 140, the data driving control signal DCS may be supplied to the data driver 130, the scan driving control signal SCS may be supplied to the scan driver 120, and the power driving control signal PCS may be supplied to the power supply 160.

In an embodiment, the driving controller 140 may receive image data corresponding to a plurality of successive frames from an external device. Image data received from the external device may include data corresponding to a static image. In this case, the driving controller 140 may divide a display area included in the pixel component 110 into a first area for displaying a static image and a second area for displaying a video. The driving controller 140 may drive pixels included in the first area at a second driving frequency, and drive pixels included in the second area at a third frequency different from the second driving frequency. Here, the second driving frequency may be less than a first driving frequency. The third driving frequency may be greater than the first driving frequency. The first driving frequency may be a driving frequency which is used, in the case where only a video is included in image data received from an external device, to output the video to the display area included in the pixel component 110.

The data driving control signal DCS may include a source start signal and clock signals. The source start signal may control a data sampling start time. The clock signals may be used to control a sampling operation.

The scan driving control signal SCS may include a scan start signal, a control start signal, and clock signals. The scan start signal may control a timing of a scan signal. The control start signal may control a timing of a control signal. The clock signals may be used to shift the scan start signal or the control start signal.

The emission driving control signal ECS may include an emission control start pulse and clock signals. The emission control start pulse may control a first timing of an emission control signal to be output from the emission driver 150. The clock signals may be used to shift the emission control start pulse.

The power driving control signal PCS may control the supply and voltage levels of the first power supply ELVDD and the second power supply ELVSS.

The scan driver 120 may receive a scan driving control signal SCS from the driving controller 140. The scan driver 120 that has been supplied with the scan driving control signal SCS may supply scan signals to the scan lines SL1 to SLn.

For example, the scan driver 120 may sequentially supply the scan signals to the scan lines SL1 to SLn. If the scan signals are sequentially supplied to the scan lines SL1 to SLn, the pixels PX may be selected on a horizontal line basis. To this end, the scan signals may be set to a gate-on voltage (e.g., a logic high level) so that transistors included in the pixels PX may be turned on.

In an embodiment, in the case where data corresponding to a static image is included in the image data, the scan driver 120 may not provide, during a preset hold frame, scan signals to pixels included in an area where the static image is displayed in the pixel component 110.

The data driver 130 may be supplied with the data driving control signal DCS and the image data from the driving controller 140. The data driver 130 may provide a data signal for displaying an image to the pixel component 110 based on the image data.

In an embodiment, in the case where data corresponding to a static image is included in the image data, the data driver 130 may not provide, during a preset hold frame, data signals to pixels included in the area where the static image is displayed in the pixel component 110.

The emission driver 150 may receive a clock signal, and an emission stop signal, and the like from the driving controller 140 and generate emission control signals to be provided to emission control lines E1 to En. The emission control signals may be sequentially supplied to the emission control lines E1 to En.

The emission control signals each may be set to a gate-off voltage (e.g., a high voltage). A transistor that receives the emission control signal may be turned off when the emission control signal is supplied thereto, and may be turned on in the other cases. Hereinafter, the expression "emission control signal is supplied" may be understood to mean that the emission control signal is supplied at a logic level that enables a transistor controlled by the emission control signal to be turned off. The power supply 160 may supply a voltage of the first power supply ELVDD and a voltage of the second power supply ELVSS based on the power driving control signal PCS. In an embodiment, the first power supply ELVDD may determine a voltage (e.g., a drain voltage) of a first electrode of a driving transistor, and the second power supply ELVSS may determine a cathode voltage of the light emitting element.

Figure 2:
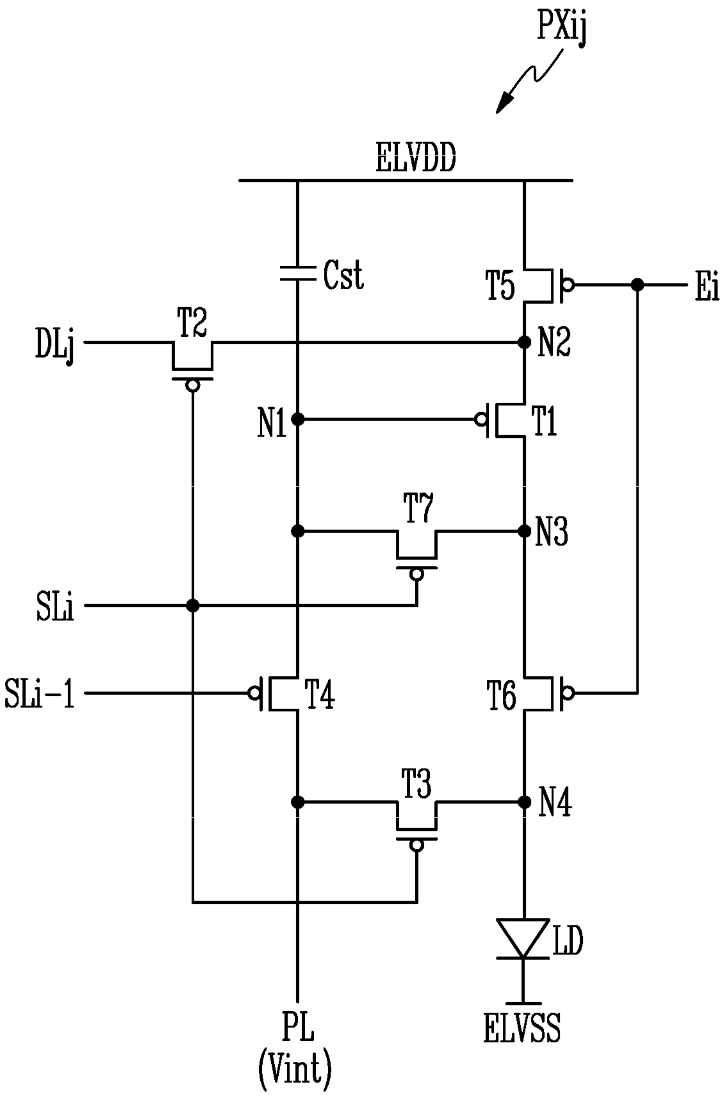
FIG. 2 is a diagram for describing the configuration and operation of a pixel circuit included in the display device in accordance with an embodiment.

FIG. 2 is a diagram for describing the configuration and operation of a pixel circuit included in the display device 100 in accordance with an embodiment.

FIG. 2 is a diagram for describing the pixel circuit in accordance with an embodiment. FIG. 2 illustrates a pixel PXij located on a junction between an i-th scan line and a j-th data line, and the configuration of each pixel circuit is not limited to that illustrated in FIG. 2.

Referring to FIG. 2, the pixel PXij provided in the display device 100 in accordance with the present disclosure may include a light emitting element LD, transistors T1 to T7, and a storage capacitor Cst. The light emitting element LD may include a first electrode (either an anode electrode or a cathode electrode) connected to a fourth node N4, and a second electrode (the other one of the cathode electrode and the anode electrode) connected to a second driving power line ELVSS. The light emitting element LD may emit light having a certain luminance corresponding to the amount of current supplied from the first transistor T1.

In an embodiment, the light emitting element LD may be an organic light emitting diode including an organic light emitting layer. Alternatively, the light emitting element LD may be an inorganic light emitting element formed of inorganic material. As a further alternative, the light emitting element LD may have a shape in which a plurality of inorganic light emitting elements are connected in parallel or series between the second driving power line ELVSSL and the fourth node N4.

The first transistor T1 (which may be referred to as a driving transistor) may include a first electrode connected to a second node N2, and a second electrode connected to a third node N3. A gate electrode of the first transistor T1 is connected to a first node N1. The first transistor T1 may control, in response to the voltage of the first node N1, driving current flowing from a first driving power line ELVDD to the second driving power line ELVSS via the light emitting element LD. The first driving power line ELVDD may be set to a voltage higher than that of the second driving power line ELVSS.

The second transistor T2 may be connected between the j-th data line DLj and the second node N2. A gate electrode of the second transistor T2 may be connected to an i-th scan line SLi. The second transistor T2 may be turned on in response to a scan signal that has a gate-on level and is supplied to the i-th scan line SLi, and thus may electrically connect the j-th data line DLj and the second node N2 to each other.

The third transistor T3 may be connected between the first electrode (i.e., the fourth node N4) of the light emitting element LD and a power line PL configured to supply an initialization voltage Vint. A gate electrode of the third transistor T3 may be connected to an i-th scan line SLi. The third transistor T3 may be turned on in response to a scan signal that has a gate-on level and is supplied to the i-th scan line SLi, so that the initialization voltage Vint may be supplied to the first electrode (i.e., the fourth node N4) of the light emitting element LD.

The fourth transistor T4 may be connected between the first node N1 and the power line PL. A gate electrode of the fourth transistor T4 may be connected to an i-th scan line SLi−1. The fourth transistor T4 may be turned on in response to a scan signal that has a gate-on level and is supplied to the i−1-th scan line SLi−1, so that the initialization voltage Vint may be supplied to the first node N1.

The fifth transistor T5 may be connected between the first driving power line ELVDD and the second node N2. A gate electrode of the fifth transistor T5 may be connected to an i-th emission control line Ei. The fifth transistor T5 may be turned on in response to an emission control signal that has a gate-on level and is supplied to the i-th emission control line Ei.

The sixth transistor T6 may be connected between the second electrode (i.e., the third node N3) of the first transistor T1 and the first electrode (i.e., the fourth node N4) of the light emitting element LD. A gate electrode of the sixth transistor T6 may be connected to the i-th emission control line Ei. The sixth transistor T6 may be turned on in response to an emission control signal that has a gate-on level and is supplied to the i-th emission control line Ei. Therefore, the fifth transistor T5 and the sixth transistor T6 may be simultaneously controlled.

The seventh transistor T7 may be connected between the second electrode (i.e., the third node N3) of the first transistor T1 and the first node N1. A gate electrode of the seventh transistor T7 may be connected to the i-th scan line SLi. The seventh transistor T7 may be turned on in response to a scan signal that has a gate-on level and is supplied to the i-th scan line SLi, and thus may electrically connect the second electrode of the first transistor T1 and the first node N1 to each other. If the seventh transistor T7 is turned on, the first transistor T1 is connected in the form of a diode.

The storage capacitor Cst may be connected between the first driving power line ELVDDL and the first node N1.

In addition, the scan lines to which the transistors T2, T3, T4, and T7 are connected may be changed in various ways. For example, the fourth transistor T4 may be connected to a separate scan line rather than to the i-th scan line SLi−1. Likewise, the third transistor T3 may also be connected to a separate scan line rather than to the i-th scan line Si.

In an embodiment, the pixel PXij may be a hybrid oxide polycrystalline (HOP) pixel. In this case, unlike the case illustrated in FIG. 2, at least one transistor of the transistors T1 to T7 may be an NMOS transistor. In other words, some transistors of the transistors T1 to T7 may be NMOS transistors, and the other transistors may be PMOS transistors. Here, an NMOS transistor may be an oxide transistor, and a PMOS transistor may be a low-temperature polycrystalline silicon (LTPS) transistor.

Figure 3:
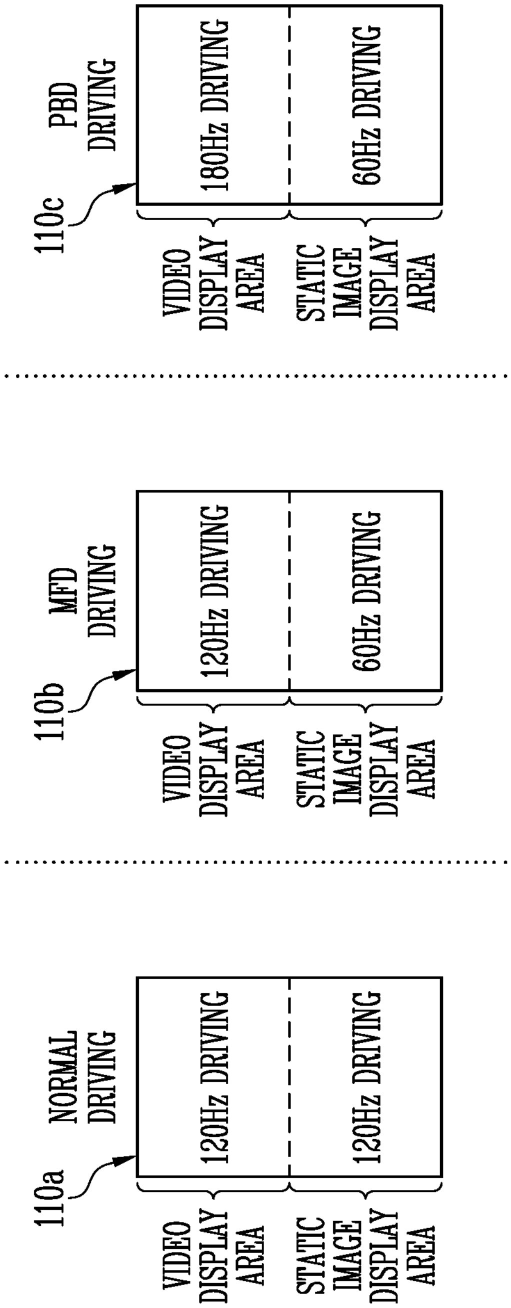
FIG. 3 is a diagram for describing a normal driving mode, a multi frequency driving (MFD) mode, and a partial boost driving (PBD) mode.

FIG. 3 is a diagram for describing a normal driving mode, a multi frequency driving (MFD) mode, and a partial boost driving (PBD) mode.

Pixel components 110*a*, 110*b*, and 110*c* in FIG. 3 each may has the same configuration as the pixel component 110 of FIG. 1.

In the case where a static image and a video are displayed together in a display area of the pixel component 110*a*, 110*b*, or 110*c*, the display device may be driven in any one mode among the normal driving mode, the MFD driving mode, and the PBD driving mode. In an embodiment, the display device may be driven in the normal driving mode when only a video without a static image is displayed in the display area in the pixel component 110.

Referring to FIG. 3, in the normal driving mode, a video display area and a static image display area may be driven at the same driving frequency. For example, both the video display area and the static image display area may be driven at 120 Hz. In other words, in the display device in accordance with an embodiment, 120 frames per second may be sequentially outputted to the video display area and the static image display area. The video display area and the static image display area may be refreshed 120 times per second. Here, in the video display area, in each frame, an image different from that in a preceding frame may be outputted. In the static image display area, in each frame, the same image as a preceding frame may be outputted.

In the MFD driving mode, the video display area may be driven at a first driving frequency, and the static image display area may be driven at a frequency less than the first driving frequency. The first driving frequency may refer to a driving frequency which is preset to output a video to the display area in the case where only video data is included in image data received from an external device. For example, in the case where the first driving frequency is set to 120 Hz, the video display area may be driven at 120 Hz, and the static image display area may be driven at 60 Hz. In other words, the video display area may be refreshed 120 times per second, and the static image display area may be refreshed 60 times per second.

In the PBD driving mode, the video display area may be driven at a frequency greater than the first driving frequency, and the static image display area may be driven at a frequency less than the first driving frequency. For example, in the case where the first driving frequency is set to 120 Hz, the video display area may be driven at 180 Hz, and the static image display area may be driven at 60 Hz. In other words, the video display area may be refreshed 180 times per second, and the static image display area may be refreshed 60 times per second.

Figure 4:
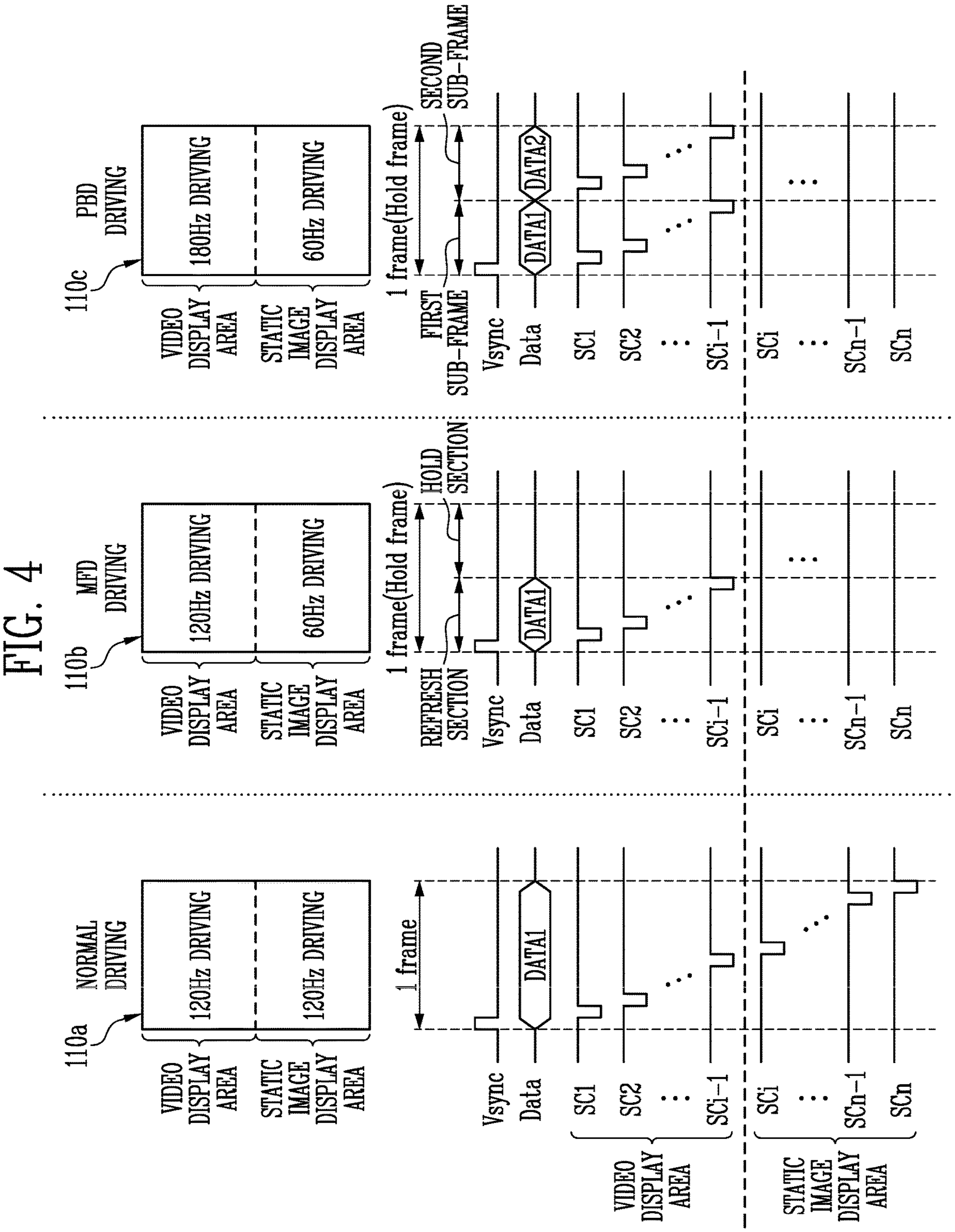
FIG. 4 is a diagram for describing in detail the normal driving mode, the MFD mode, and the PBD mode in accordance with an embodiment.

FIG. 4 is a diagram for describing in detail the normal driving mode, the MFD driving mode, and the PBD driving mode in accordance with an embodiment.

FIG. 4 provides timing diagrams illustrating scan signals SC and data signal DATA which are applied to a plurality of pixels included in the pixel component 110 in each of the normal driving mode, the MFD driving mode, and the PBD driving mode. A vertical synchronization signal Vsync may be a reference signal, which defines one frame. In other words, the start of each frame may be synchronized with the start of the vertical synchronization signal Vsync, and the end of each frame may be synchronized with the start of a subsequent vertical synchronization signal Vsync.

Referring to FIG. 4, first to n-th scan signals SC1 to SCn may respectively correspond to the first to n-th scan lines SL1 to SLn of FIG. 1. In other words, the first scan signal SC1 may be provided, through the first scan line SL1, to the first pixel row among the plurality of pixel rows included in the pixel component 110 of FIG. 1. In other words, the n-th scan signal SCn may be provided, through the n-th scan line SLn, to the n-th pixel row among the plurality of pixel rows included in the pixel component 110 of FIG. 1. An i-th scan signal SCi may be provided, through an i-th scan line SLi, to an i-th pixel row among the plurality of pixel rows included in the pixel component 110 of FIG. 1. The scan driver 120 of FIG. 1 may sequentially provide the scan signals SC1 to SCn to the pixel rows that respectively correspond to the plurality of scan lines SL1 to SLn.

The lower left diagram of FIG. 4 is a timing diagram illustrating scan signals and data signals which are provided to the pixels included in the video display area and the static image display area in the display area while the display device is driven in the normal driving mode.

Referring to FIG. 4, while images are displayed in the display area during one frame 1frame, the first scan signal SC1 to an i−1-th scan signal SCi−1 may be provided to the pixel rows that correspond to the video display area, and an i-th scan signal SCi to the n-th scan signal SCn may be provided to the pixel rows that correspond to the static image display area. While images are displayed during one frame 1frame, a plurality of pixels included in each of the video display area and the static image display area may be supplied with data signals DATA1 corresponding to the respective pixels. In other words, in the normal driving mode, the video and the static image may be refreshed in each frame.

The lower middle diagram of FIG. 4 is a timing diagram illustrating scan signals and data signals which are provided to the pixels included in the video display area and the static image display area in the display area while the display device is driven in the MFD driving mode.

Referring to FIG. 4, at least one frame among a plurality of frames corresponding to image data received from an external device may be set to a hold frame. The hold frame may be a frame in which a static image is not refreshed among the plurality of frames. The hold frame may include a refresh section in which an image in the video display area is refreshed, and a hold section in which an image in the static image display area is not refreshed.

Referring to FIG. 4, in the hold frame, the first scan signal SC1 to the i−1-th scan signal SCi−1 may be provided to the pixel rows that correspond to the video display area. Here, unlike the normal driving mode, in the case of the MFD driving mode, during the hold frame, a static image displayed in a preceding frame may be maintained rather than being refreshed. Therefore, in the hold frame, the i-th scan signal SCi to the n-th scan signal SCn may not be provided to the pixel rows that correspond to the static image display area.

Furthermore, in the hold frame, no data signal may be provided to the pixels that are included in the static image display area. Consequently, because some frames among a plurality of frames corresponding to the image data received from the external device are set to hold frames in which a static image is not refreshed, the driving frequency of the static image display area may be reduced.

The lower right diagram of FIG. 4 is a timing diagram illustrating scan signals and data signals which are provided to the pixels included in the video display area and the static image display area in the display area while the display device is driven in the PBD driving mode.

Referring to FIG. 4, at least one frame among a plurality of frames corresponding to the image data received from the external device may be set to a hold frame. In the PBD driving mode, the hold frame may include a first sub-frame and a second sub-frame. In other words, in each frame, a refresh section and a hold section may be respectively allocated to the first sub-frame and the second sub-frame.

Referring to FIG. 4, in the first sub-frame, the first scan signal SC1 to the i−1-th scan signal SCi−1 may be provided to the pixel rows that correspond to the video display area. Furthermore in the second sub-frame, the first scan signal SC1 to the i−1-th scan signal SCi−1 may be provided to the pixel rows that correspond to the video display area. The first sub-frame and the second sub-frame may correspond to respective different images (or the same image). In the same manner as the MFD driving mode, in a hold frame, the static image display area may not be refreshed, and an image displayed in a preceding frame may be maintained as it is. Therefore, in the hold frame, the i-th scan signal SCi to the n-th scan signal SCn may not be provided to the pixel rows that correspond to the static image display area. Furthermore, in the hold frame, no data signal may be provided to the pixels that are included in the static image display area.

Consequently, because some frames among a plurality of frames corresponding to the image data received from the external device are set to hold frames in which a static image is not refreshed, the driving frequency of the static image display area may be reduced. Furthermore, as the hold section in each of the set hold frames is allocated to the second sub-frame, the driving frequency of the video display area may be increased.

In the case where the image data received from the external device includes only video data, the display device in accordance with an embodiment may be driven in the normal driving mode. For example, the entirety of the display area included in the pixel component 110 of FIG. 1 may be driven at 120 Hz.

In the case where the image data received in the external device includes both video data and static image data, the display device may be driven in the MFD driving mode or the PBD driving mode. In the case where the driving mode of the display device is changed from the normal driving mode to the MFD driving mode, the driving frequency of the static image display area may be rapidly changed. Furthermore, in the case where the driving mode of the display device is changed from the normal driving mode to the PBD driving mode, the driving frequencies of the video display area and the static image display area may be rapidly changed. In this case, the user may discern a difference in luminance due to a rapid change in driving frequency.

Figure 5:
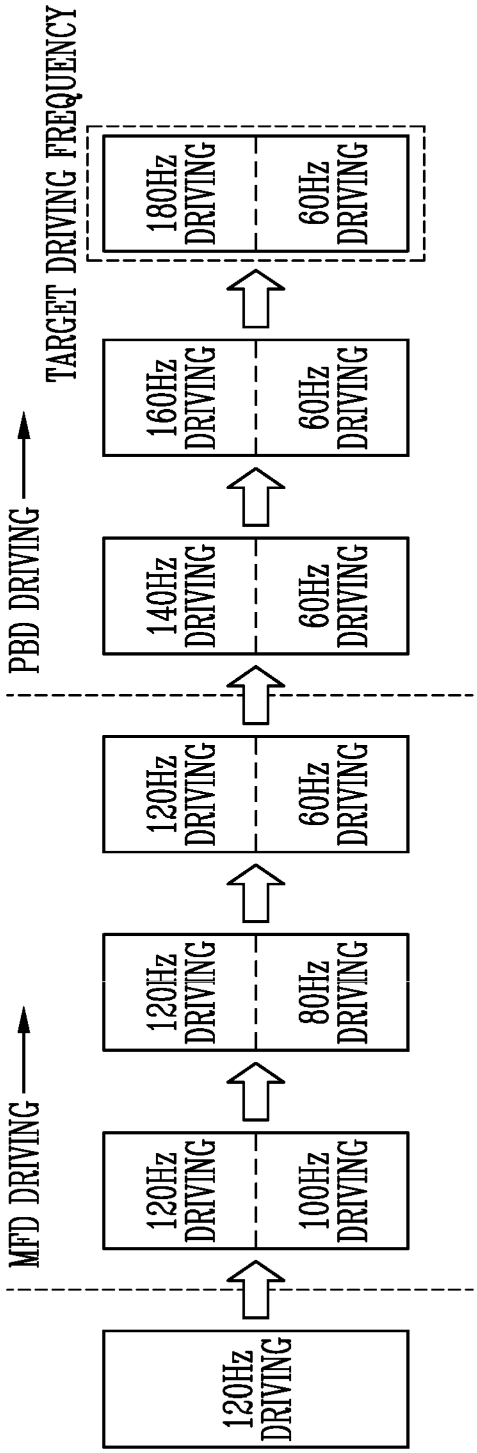
FIG. 5 is a diagram for describing a driving mode of the display device in accordance with an embodiment.

FIG. 5 is a diagram for describing a driving mode of the display device in accordance with an embodiment.

Referring to FIG. 5, in the case where the driving mode of the display device is changed, the driving frequency of each display area may be gradually reduced or increased in a plurality steps. For example, in the case where the display device that has been driven in the normal driving mode receives from an external device image data including both static image data and video data, the driving mode of the display device may be changed to the PBD driving mode. In this case, the display device may determine a target driving frequency. The target driving frequency may include a driving frequency of the video display area and a driving frequency of the static image display area. The target driving frequency may be preset such that the driving frequency of the video display area is greater than the first driving frequency, and the driving frequency of the static image display area is less than the first driving frequency, and may be stored in a separate register (not illustrated). Here, the first driving frequency may be a diving frequency which is used to output a video to the display area included in the pixel component in the case where only video is included in image data received from the external device, and may be a preset driving frequency.

For example, the first driving frequency may be 120 Hz, and in the case of the target driving frequency, the driving frequency of the video display area may be set to 180 Hz, and the driving frequency of the static image display area may be set to 60 Hz. In an embodiment, the driving frequency of the static image display area may be reduced from the first driving frequency by a preset step frequency. The static image display area may be driven using the reduced driving frequency for a preset time. In an embodiment, the driving frequency of the video display area may be increased from the first driving frequency by a preset step frequency. The video display area may be driven using the increased driving frequency for a preset time.

The size of the step frequency and the time for which the display device is driven at a changed driving frequency may be preset and stored in a separate register (not illustrated) in the display device. Referring to FIG. 5, in an embodiment, the step frequency may be set to 20 Hz, and the time for which the display device is driven at a changed driving frequency at each step may be set to one second. The present disclosure is not limited thereto, and the size of the step frequency and the time for which the display device is driven at the changed driving frequency may be set to various values.

Referring to FIG. 5, each time the number of steps increases, the driving frequency of the static image display area may be reduced by the step frequency until the driving frequency reaches a target frequency. Each time the number of steps increases, the driving frequency of the video display area may be increased by the step frequency until the driving frequency reaches a target frequency. The display device may be driven at a changed driving frequency for a preset time at each step.

In detail, at a first step, the driving frequency of the static image display area may be reduced to 100 Hz. The static image display area may be driven at 100 Hz for a second. At a subsequent step, the driving frequency of the static image display area may be reduced to 80 Hz. The static image display area may be driven at 80 Hz for a second. At a subsequent step, the driving frequency of the static image display area may be reduced to 60 Hz. The static image display area may be driven at 60 Hz for a second. While the driving frequency of the static image display area is changed, the driving frequency of the video display area may be maintained at 120 Hz.

At a fourth step, the driving frequency of the video display area may be increased to 140 Hz. The video display area may be driven at 140 Hz for a second. At a subsequent step, the driving frequency of the video display area may be increased to 160 Hz. The video display area may be driven at 160 Hz for a second. At a subsequent step, the driving frequency of the video display area may be increased to 180 Hz. While the driving frequency of the video display area is changed, the driving frequency of the static image display area may be maintained at 60 Hz. After the driving frequency of the display device reaches the target driving frequency, the display device may be continuously driven at the target driving frequency.

Figure 6:
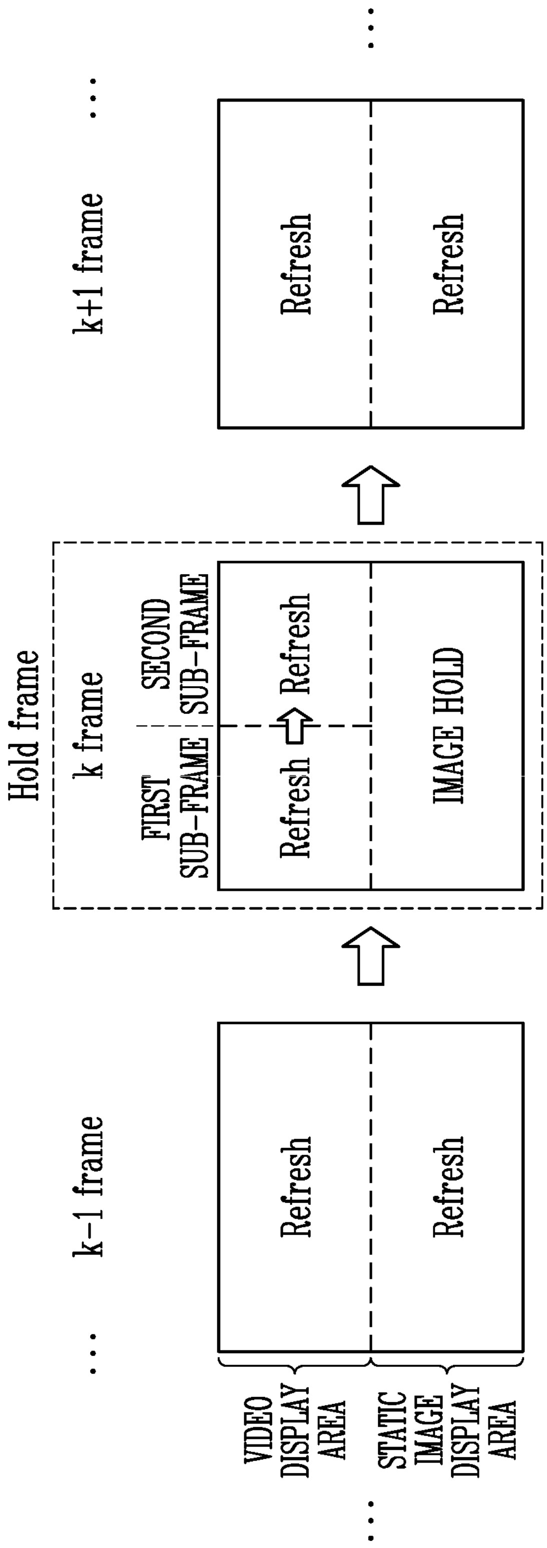
FIG. 6 is a diagram for describing in detail the driving mode of the display device in accordance with an embodiment.

FIG. 6 is a diagram for describing in detail the driving mode of the display device in accordance with an embodiment.

Referring to FIG. 6, in the case where image data received from the external device includes static image data and video data, the display device may set at least one of a plurality of frames corresponding to the image data to a hold frame. In FIG. 6, a k-th frame among three successive frames k−1 frame, k frame, and k+1 frame may be set to the hold frame.

In the hold frame, the static image display area may maintain an image displayed in the static image display area in a preceding frame, rather than being refreshed. The driving controller 140 of FIG. 1 may control the scan driver 120 and the data driver 130 such that the static image display area is not refreshed in the hold frame. Because the static image display area is controlled not to be refreshed in the hold frame, the driving frequency of the static image display area may be reduced.

In the hold frame, the video display area may be refreshed two times. In an embodiment, the k-th frame set to the hold frame may include a first sub-frame and a second sub-frame. The driving controller 140 of FIG. 1 may control the scan driver 120 and the data driver 130 such that the video display area is refreshed two times in the hold frame. Because the video display area is controlled to be refreshed two times in the hold frame, the driving frequency of the video display area may be increased.

Figure 8:
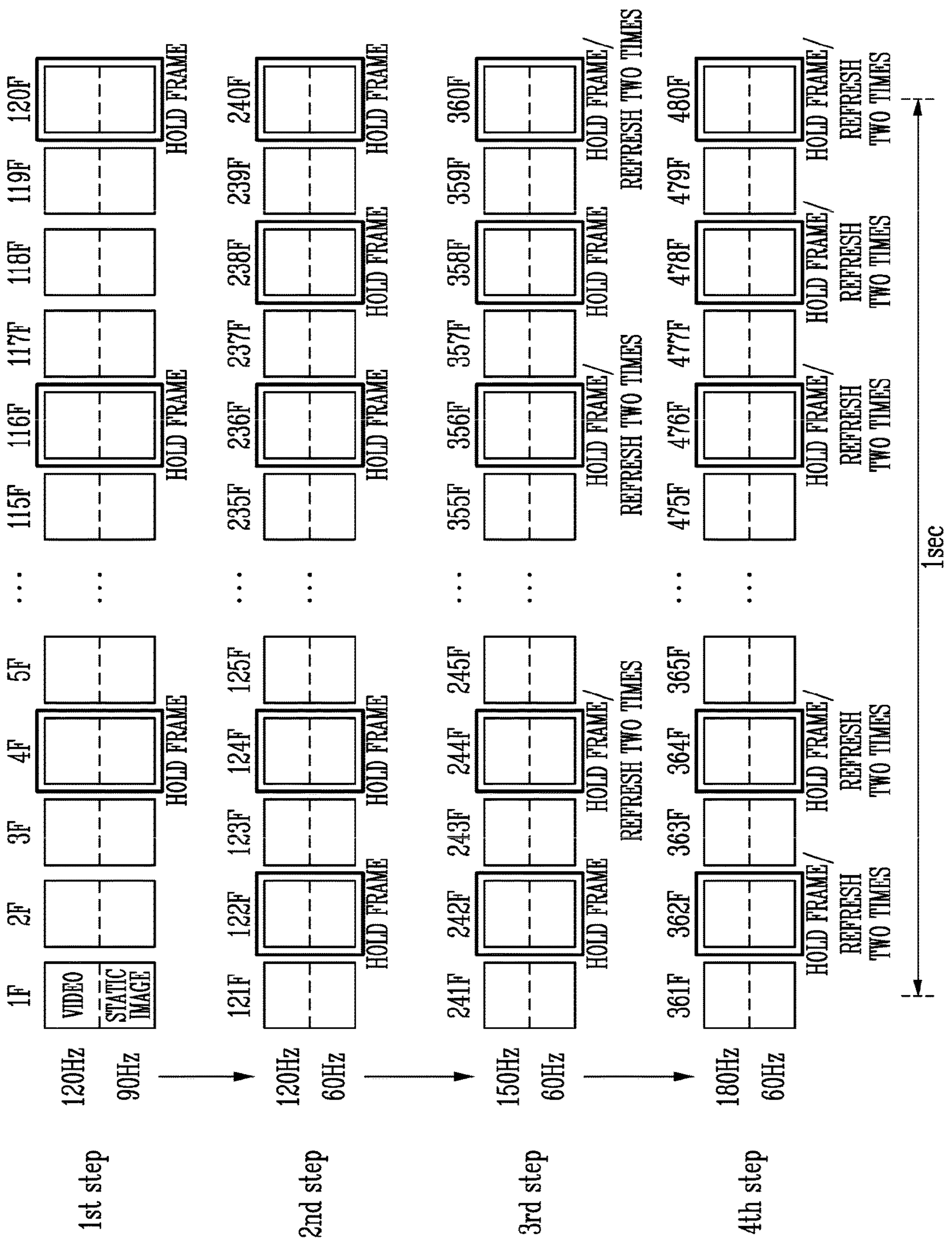

FIGS. 7 and 8 are diagrams illustrating a pattern in which hold frames among a plurality of frames are set.

Referring to FIG. 7, in an embodiment, with regard to the target driving frequencies, the driving frequency of the video display area may be set to 180 Hz, and the driving frequency of the static image display area may be set to 60 Hz. In an embodiment, the step frequency may be set to 30 Hz. In an embodiment, the driving time per step may be set to one second. Although not illustrated, information about the target driving frequency, the step frequency, and the driving time per step may be pre-stored in a separate resister provided in the display device. Furthermore, detailed values of the target driving frequency, the step frequency, and the driving time per step are not limited to the embodiments of the present disclosure, and may be set to various values and stored in the register.

Referring to FIG. 8, at a first step 1st step, the video display area may be driven at a driving frequency of 120 Hz, and the static image display area may be driven at a driving frequency of 90 Hz. To this end, at the first step 1st step, 30 frames among 120 frames 1F to 120F may be set to hold frames. In this case, one of every four frames among the 120 frames may be set to a hold frame. In other words, among the 120 frames at the first step 1st step, frames such as a fourth frame 4F, an eighth frame (not illustrated), a 116th frame 116F, and a 120th frame 120F, corresponding to the multiples of 4 may be set to hold frames. In the hold frame, the static image display area may maintain an image displayed in the static image display area in a preceding frame, rather than being refreshed. Therefore, the static image display area may be driven at a driving frequency of 90 Hz. The video display area may be refreshed once every frame for a second.

At a second step 2nd step, the video display area may be driven at a driving frequency of 120 Hz, and the static image display area may be driven at a driving frequency of 60 Hz. To this end, at the second step 2nd step, 60 frames among 120 frames 121F to 240F may be set to hold frames. In this case, one of every two frames among the 120 frames may be set to a hold frame. In other words, among the 120 frames at the second step 2nd step, frames such as a 122th frame 122F, a 124th frame 124F, a 236th frame 236F, a 238th frame 238F, and a 240th frame 240F, corresponding to the multiples of 2 may be set to hold frames. In the hold frame, the static image display area may maintain an image displayed in the static image display area in a preceding frame, rather than being refreshed. Therefore, the static image display area may be driven at a driving frequency of 60 Hz. The video display area may be refreshed once every frame for a second.

At a third step 3rd step, the video display area may be driven at a driving frequency of 150 Hz, and the static image display area may be driven at a driving frequency of 60 Hz. To this end, at the third step 3rd step, 60 frames among 120 frames 241F to 360F may be set to hold frames. In this case, one of every two frames among the 120 frames 241F to 360F may be set to a hold frame. In other words, among the 120 frames at the third step 3rd step, frames such as a 242th frame 242F, a 244th frame 244F, a 356th frame 356F, a 358th frame 358F, and a 360th frame 360F, corresponding to the multiples of 2 may be set to hold frames.

Furthermore, in 30 hold frames corresponding to a half of the 60 hold frames set at the third step 3rd step, the video display area may be refreshed two times. In other words, in frames such as the 244th frame 244F, a 248th frame (not illustrated), the 356th frame 356F, and the 360th frame 360F, corresponding to the multiples of 4, among the 120 frames 241F to 360F at the third step 3rd step, the static image display area may not be refreshed, and the video display area may be refreshed two times. Because 60 frames among the 120 frames 241F to 360F at the third step 3rd step are set to hold frames and the video display area is refreshed two times in 30 hold frames among the 60 frames, the static image display area may be driven at a driving frequency of 60 Hz, and the video display area may be driven at a driving frequency of 150 Hz.

At a fourth step 4th step, the video display area may be driven at a driving frequency of 180 Hz, and the static image display area may be driven at a driving frequency of 60 Hz. To this end, at the fourth step 4th step, 60 frames among 120 frames 361F to 480F may be set to hold frames. In this case, one of every two frames among the 120 frames 361F to 480F may be set to a hold frame. In other words, among the 120 frames 361F to 480F at the fourth step 4th step, frames such as a 362th frame 362F, a 364th frame 364F, a 476th frame 476F, a 478th frame 478F, and a 480th frame 480F, corresponding to the multiples of 2 may be set to hold frames.

Furthermore, in the 60 hold frames set at the fourth step 4th step, the video display area may be refreshed two times. In other words, in frames such as the 362th frame 362F, the 364th frame 364F, the 476th frame 476F, the 478th frame 478F, and the 480th frame 480F, corresponding to the multiples of 2, among the 120 frames 361F to 480F at the fourth step 4th step, the static image display area may not be refreshed, and the video display area may be refreshed two times. Because 60 frames among the 120 frames 361F to 480F at the fourth step 4th step are set to hold frames and the video display area is refreshed two times in all of the 60 hold frames, the static image display area may be driven at a driving frequency of 60 Hz, and the video display area may be driven at a driving frequency of 180 Hz.

Because at the fourth step 4th step the driving frequency of the display device has reached the target frequency, the display device may be continuously driven at the target frequency since a subsequent frame (e.g., a 481th frame).

The number of hold frames set at each step may be set to a value different from that of the embodiment described with reference to FIG. 8. For example, the target driving frequency, the step frequency, and the driving time per step may be set to values different from those of the embodiment of FIG. 8, so that the number of hold frames set at each step may also be changed.

A pattern in which hold frames among a plurality of frames are set may be changed in various ways rather than being limited to the embodiments of the present disclosure. The pattern in which the hold frames are set may be stored in a separate register (not illustrated) provided in the display device.

Figure 9:
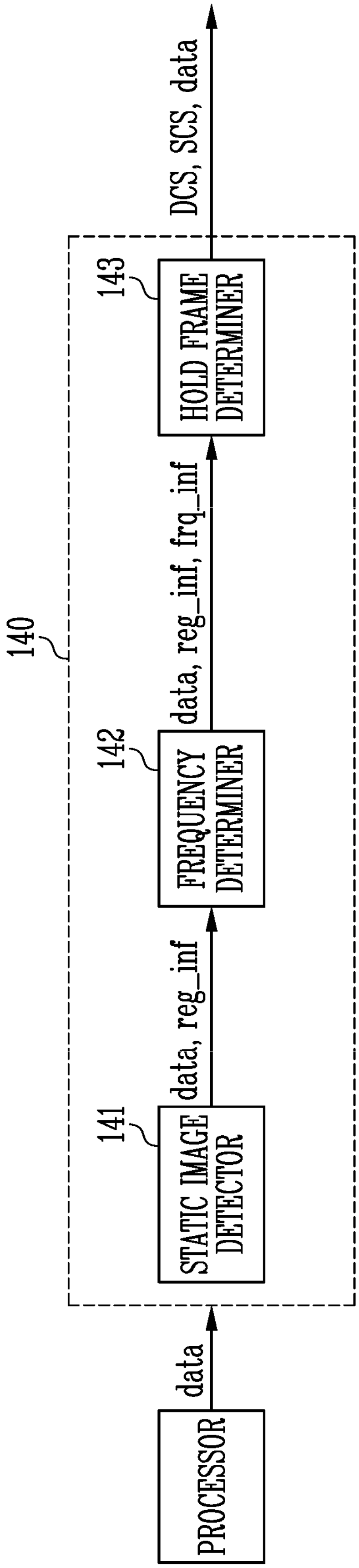
FIG. 9 is a diagram for describing in detail the configuration and operation of a driving controller in accordance with an embodiment.

FIG. 9 is a diagram for describing in detail the configuration and operation of the driving controller 140 in accordance with an embodiment.

Referring to FIG. 9, the driving controller 140 may include a static image detector 141, a frequency determiner 142, and a hold frame determiner 143. The driving controller 140 may receive image data from an external processor provided outside the display device. The image data may correspond to a plurality of successive frames. The image data may include a static image and a video.

In the case where data corresponding to a static image is included in image data that is received from an external device and corresponds to a plurality of frames, the driving controller 140 may divide a display area included in the pixel component 110 into a static image display area in which the static image is displayed and a video display area in which a video is displayed. The driving controller 140 may control the scan driver 120, the data driver 130, and the pixel component 110 such that pixels included in the static image display area are driven at the second driving frequency less than the first driving frequency, and pixels included in the video display area is driven at the third driving frequency greater than the first driving frequency.

In detail, the static image detector 141 may check whether data corresponding to the static image is included in the image data. In the case where the data corresponding to the static image is included in the image data, the static image detector 141 may check whether a static image and a video are simultaneously displayed. In the case where the static image and the video are simultaneously displayed, the static image detector 141 may generate region information reg_info about regions occupied by the static image display area and the video display area in the pixel component 110. The generated region information reg_info along with the image data may be provided to the frequency determiner 142.

The frequency determiner 142 may determine the driving frequencies of the static image display area and the video display area, based both on whether data corresponding to the static image is included in the image data and on the region information reg_info received from the static image determiner 141. In the case where data corresponding to the static image is not included in the image data, the frequency determiner 142 may determine a driving frequency corresponding to the entirety of the display area to be the first driving frequency. In the case where data corresponding to the static image is included in the image data, the frequency determiner 142 may determine a driving frequency corresponding to the static image display area in the display area to be the second driving frequency lower than the first driving frequency, and may determine a driving frequency corresponding to the video display area to be the third driving frequency higher than the first driving frequency. The frequency determiner 142 may provide frequency information frq_info including information about the determined driving frequencies of the static image display area and the video display area to the hold frame determiner 143.

In the case where data corresponding to the static image is included in the image data, the hold frame determiner 143 may determine some of a plurality of frames to be hold frames, based on the determined frequency information frq_info. The hold frame may be a frame in which the static image display area maintains an image displayed in a preceding frame without being refreshed.

The driving controller 140 may control the scan driver 120, the data driver 130, and the pixel component 110 such that the driving frequency corresponding to the static image display area is gradually reduced from the first driving frequency to the second driving frequency over a first time period, and the driving frequency corresponding to the video image display area is gradually increased from the first driving frequency to the third driving frequency over a second time period. The first driving frequency may be reduced to the second driving frequency over a plurality of steps, as described with reference to FIGS. 6 to 8. Furthermore, the first driving frequency may be increased to the third driving frequency over a plurality of steps, as described with reference to FIGS. 6 to 8. Here, the time it takes for the first driving frequency to reduce or increase and reach the target frequency may be determined depending on the size of a preset step frequency and the time for which the display device is driven at a reduced or increased driving frequency at each step.

Although not illustrated in FIG. 9, the driving controller 140 may further include a control signal generator configured to generate a data driving control signal DCS for controlling the data driver 130, and a scan driving control signal SCS for controlling the scan driver 120. In this case, the control signal generator may generate control signals for controlling the data driver 130 and the scan driver 120 such that the driving frequency corresponding to the first area is gradually reduced from the first driving frequency to the second driving frequency for the first time, and the driving frequency corresponding to the second area is gradually increased from the first driving frequency to the third driving frequency for the second time.

In an embodiment, the driving controller 140 may provide the data driving control signal DCS and the image data to the data driver 130. The driving controller 140 may provide, to the scan driver 120, the scan driving control signal SCS for controlling the scan driver 120.

Figure 10:
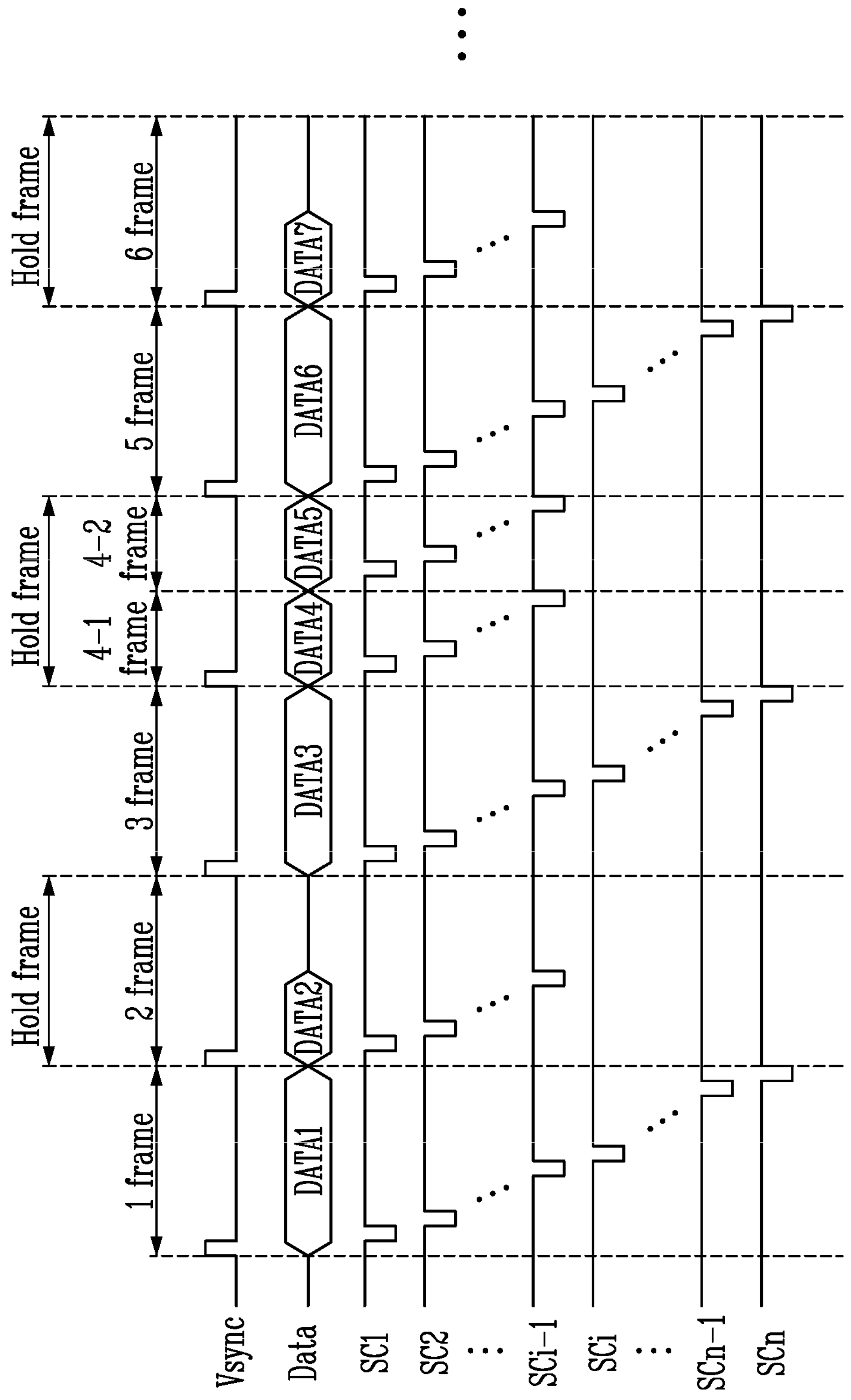
FIG. 10 is a timing diagram for describing signals to be provided to a pixel component from a scan driver and a data driver in accordance with an embodiment.

FIG. 10 is a timing diagram for describing signals to be provided to the pixel component from the scan driver and the data driver in accordance with an embodiment.

Image data received from an external device may correspond to a plurality of frames. Referring to FIG. 10, first to sixth frames 1frame to 6frame may be included in the plurality of frames. The first to fifth frames 1frame to 5frame of FIG. 10 may respectively correspond to the 241th to 245th frames 241F to 245F of FIG. 8.

In FIG. 10, a vertical synchronization signal Vsync may be a reference signal, which defines one frame. A data signal Data may be a data voltage to be applied, in synchronization with a scan signal SC in each frame, to a plurality of pixels included in each of the pixel rows. First to n-th scan signals SC1 to SCn may respectively correspond to the first to n-th scan lines SL1 to SLn of FIG. 1. In other words, the first to n-th scan signals SC1 to SCn may be respectively sequentially provided to the first to n-th pixel rows included in the pixel component 110 of FIG. 1 through the first to n-th scan lines SL1 to SLn. In an embodiment, the first scan signal SC1 to an i−1-th scan signal SCi−1 may be provided to the pixel rows that correspond to the video display area, and an i-th scan signal SCi to the n-th scan signal SCn may be provided to the pixel rows that correspond to the static image display area.

Because the first, third, and fifth frames among the first to sixth frames are not set to hold frames, the first to n-th scan signals SC1 to SCn may be respectively sequentially provided to the pixel rows. In synchronization with the scan signals provided to the respective pixel rows, data signals DATA1, DATA3, and DATA6 may be provided to the pixels included in the pixel rows.

Each of the hold frames may include a refresh section in which the video display area is refreshed, and a hold section in which an image displayed in the static image display area in a preceding frame is maintained. In the refresh section, scan signals may be sequentially provided to the pixel rows corresponding to only the video display area among the static image display area and the video display area.

In detail, the second frame, the 4-1-th and 4-2-th frames, the sixth frame among the first to sixth frames may be set to hold frames. The 4-1-th frame and the 4-2-th frame may form one hold frame. Because the second, 4-1-th, 4-2-th, and sixth frames are set to hold frames, scan signals SCi to SCn may not be provided to the pixels corresponding to the static image display area when each frame is displayed in the display area.

Furthermore, because the second, 4-1-th, 4-2-th, and sixth frames are set to hold frames, data signals DATA2, DATA4, DATA5, and DATA 7 of the second, 4-1-th, 4-2-th, and sixth frames may not include signals for data corresponding to the static image display area. In other words, in the case of the second, 4-1-th, 4-2-th, and sixth frames, a data voltage may not be provided to the pixels included in the static image display area.

In FIG. 10, in a second hold frame among a plurality of frames, the video display area may be refreshed two times. In other words, the refresh section in the second hold frame may be allocated to the 4-1-th frame, and the hold section may be allocated to the 4-2-th frame. Each of the 4-1-th frame and the 4-2-th frame, the video display area may be refreshed.

Therefore, the scan driver 120 of FIG. 1 may sequentially provide the scan signals SC1 to SCi−1 to the pixel rows that correspond to the video display area among the plurality of pixel rows in the 4-1-th frame, and thereafter sequentially provide scan signals SC1 to SCi−1 to the pixel rows that correspond to the video display area among the plurality of pixels in the 4-2-th frame. The data driver 130 of FIG. 1 may provide, in synchronization with the scan signals SC1 to SCi−1, the data signals DATA4 and DATA5 to the pixels included in each of the pixel rows that correspond to the video display area among the plurality of pixel rows in each of the 4-1-th frame and the 4-2-th frame.

The length of time for which each of the 4-1-th frame and the 4-2-th frame is displayed may be less than the length of time for which each of the remaining frames other than the 4-1-th frame and the 4-2-th frame among the first to sixth frames is displayed.

Figure 11:
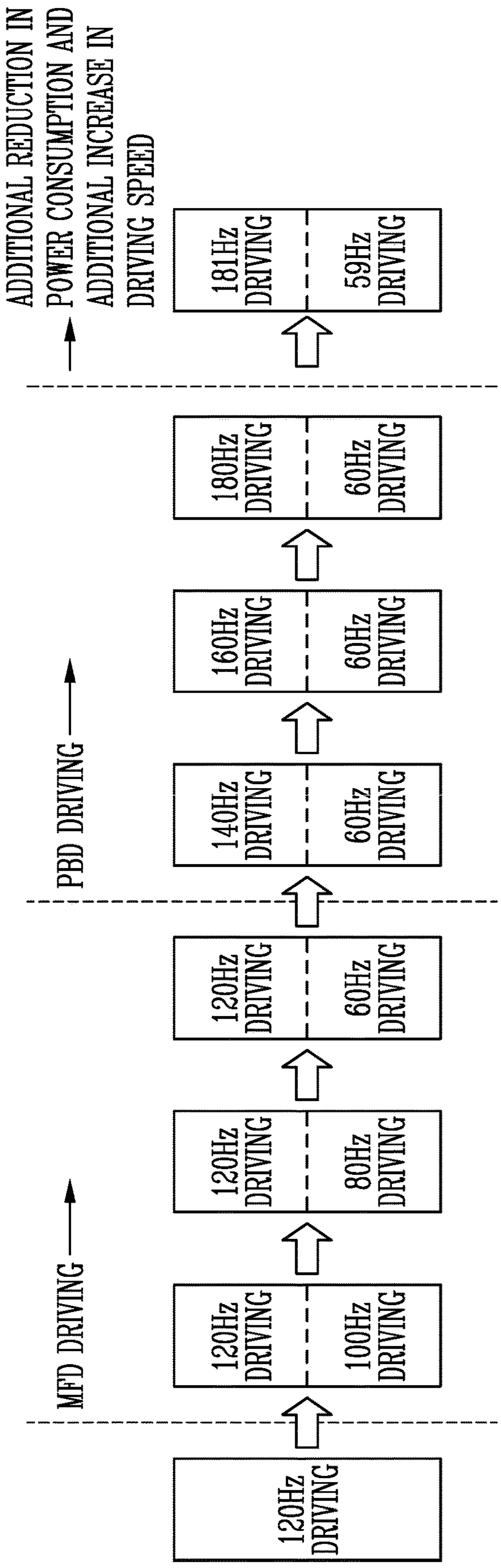
FIG. 11 is a block diagram for describing a method of driving the display device in accordance with an embodiment.

FIG. 11 is a block diagram for describing a method of driving the display device in accordance with an embodiment.

In an embodiment, the display device may be configured such that, in a first mode for further reducing the power consumption, some of the remaining frames other than the already set hold frames among the plurality of frames may be set to additional hold frames. Hence, the driving frequency corresponding to the static image display area may be further reduced, so that the power consumption can be reduced.

Furthermore, in the display device, in a second mode for high speed driving, the refresh section and the hold section included in at least one hold frame among the hold frames added in the first mode may be respectively allocated to a first sub-frame and a second sub-frame, so that the driving frequency corresponding to the video display area can be further increased, whereby the video display area can be driven at a higher speed.

In detail, referring to FIG. 11, in the case where the target driving frequency of the video display area is set to 180 Hz and the target driving frequency of the static image display area is set to 60 Hz, the display device may further set one frame among the plurality of frames to an additional hold frame in the first mode, thus reducing the driving frequency of the static image display area to 59 Hz. Furthermore, in the second mode, the display device may respectively allocate the refresh section and the hold section of the additional hold frame to a first sub-frame and a second sub-frame so that the driving frequency of the video display area can be increased to 181 Hz. The number of additional hold frames set in the first mode and the second mode may be changed in various values rather than being limited to the embodiments.

Figure 12:
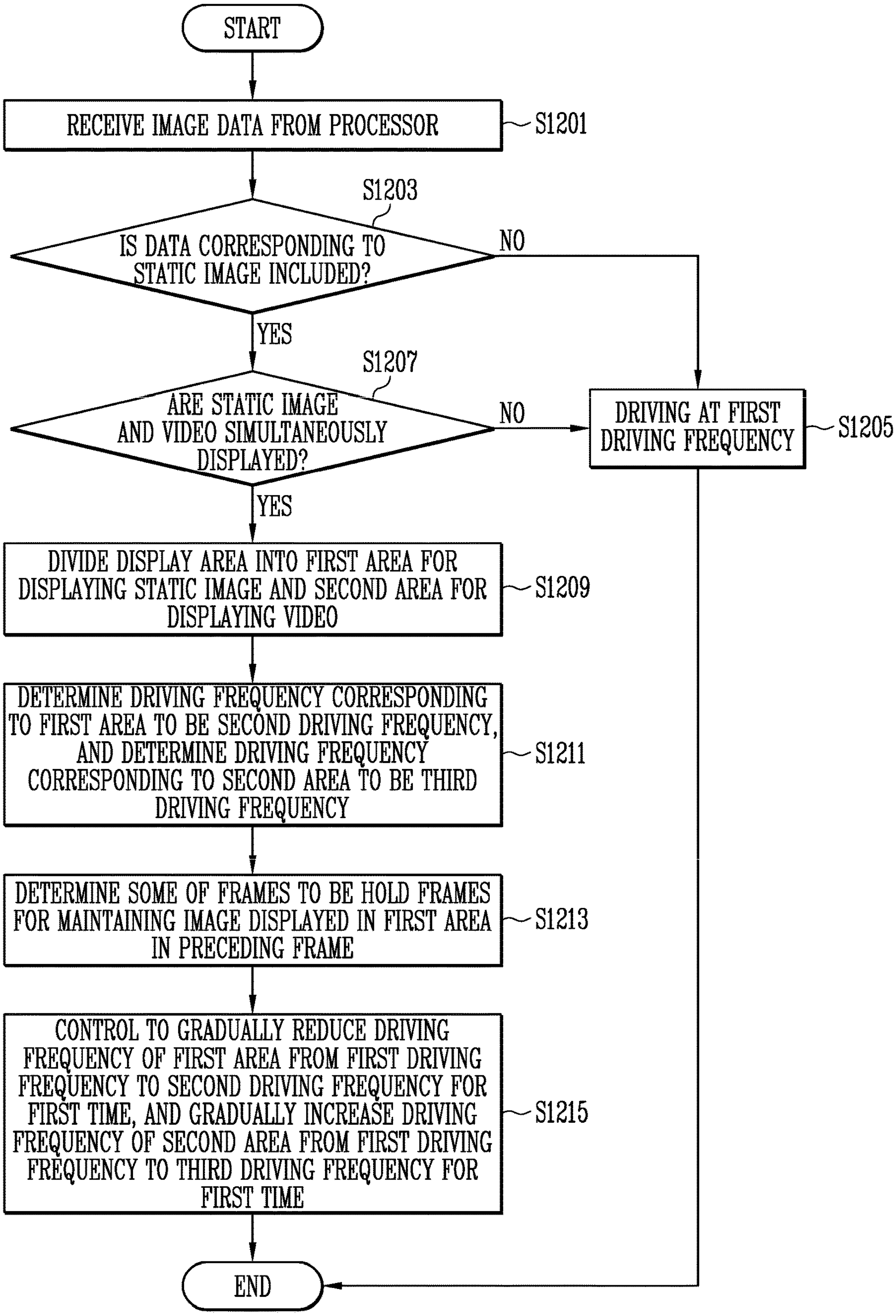
FIG. 12 is a flowchart for describing in detail the operation of the display device in accordance with an embodiment.

FIG. 12 is a flowchart for describing in detail the operation of the display device in accordance with an embodiment.

Referring to FIG. 12, at step S1201, the display derive may receive image data from an external processor.

At step S1203, the display device may determine whether the image data received from the external processor includes data corresponding to a static image Here, in the case where the image data does not include data corresponding to a static image, the display device may be determined to be driven at the first driving frequency (at step S1205).

At step S1207, in the case where the image data includes data corresponding to a static image, the display device may determine whether a static image and a video are simultaneously displayed in the display area. Here, in the case where the static image and the video are not simultaneously displayed in the display area, the display device may be determined to be driven at the first driving frequency (at step S1205).

At step S1209, in the case where the static image and the video are simultaneously displayed, the display area may be divided into a first area in which the static image is displayed and a second area in which the video are displayed.

At step S1211, the display device may determine a driving frequency corresponding to the first area to be the second driving frequency lower than the first driving frequency, and may determine a driving frequency corresponding to the second area to be the third driving frequency higher than the first driving frequency.

At step S1213, the display device may set at least one frame among a plurality of frames to a hold frame in which an image displayed in the first area in a preceding frame is maintained.

At step S1215, the display device may control the scan driver 120, the data driver, and the pixel component 110 such that the driving frequency of the first area is gradually reduced from the first driving frequency to the second driving frequency over a first time period, and the driving frequency of the second area is gradually increased from the first driving frequency to the third driving frequency over a second time period.

A display device in accordance with an embodiment of the present disclosure may provide a high-quality image to a user with low power consumption.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. A display device comprising:

a pixel component configured to output an image refreshed in each frame based on a preset first driving frequency, and including a plurality of pixel rows each including a plurality of pixels;

a scan driver configured to sequentially provide a scan signal to each of the plurality of pixel rows in each frame according to the first driving frequency; and a driving controller configured to control the scan driver such that, in a case where image data that is received from an external device and corresponds to a plurality of successive frames includes data corresponding to a static image, a display area included in the pixel component is divided into a first area in which the static image is displayed, and a second area in which a video is displayed, and pixels included in the first area are driven at a second driving frequency less than the first driving frequency, and pixels included in the second area are driven at a third driving frequency greater than the first driving frequency, wherein the driving controller controls the scan driver such that a driving frequency corresponding to the first area is gradually reduced from the first driving frequency to the second driving frequency over a first time period, and a driving frequency corresponding to the second area is gradually increased from the first driving frequency to the third driving frequency over a second time period.

2. The display device according to claim 1, wherein the driving controller comprises:

a static image detector configured to check whether the image data includes data corresponding to the static image, and generate, in a case where the image data includes the data corresponding to the static image, region information that is information about regions occupied by the first area and the second area in the pixel component;

a frequency determiner configured to determine a driving frequency of each display area in the pixel component, based both on whether the image data includes the data corresponding to the static image and on the region information; and a hold frame determiner configured to set, in a case whether the image data includes the data corresponding to the static image, some of the plurality of frames to hold frames in each of which an image displayed in the first area in a preceding frame is maintained without being refreshed, based on information about the determined frequency.

3. The display device according to claim 2, wherein the frequency determiner determines a driving frequency corresponding to an entirety of the display area to be the first driving frequency in a case where the image data does not include the data corresponding to the static image, and determines, in a case where the image data includes the data corresponding to the static image, the driving frequency corresponding to the first area of the display area to be the second driving frequency, and determines the driving frequency corresponding to the second area to be the third driving frequency.

4. The display device according to claim 2, wherein the driving controller controls, when gradually reducing the first driving frequency to the second driving frequency, the pixel component and the scan driver such that the first driving frequency is reduced to the second driving frequency by a plurality of steps, and at each of the steps, the display device is driven during a plurality of preset frames at a driving frequency reduced from a driving frequency of a preceding step by a preset step frequency, and controls, when gradually increasing the first driving frequency to the third driving frequency, the pixel component and the scan driver such that the first driving frequency is increased to the third driving frequency by a plurality of steps, and at each of the steps, the display device is driven during the plurality of preset frames at a driving frequency increased from a driving frequency of a preceding step by a preset step frequency, and wherein the first time period and the second time period are determined depending on a size of the preset step frequency and the number of preset frames.

5. The display device according to claim 4, wherein each of the hold frames includes a refresh section in which the second area is refreshed, and a hold section in which an image displayed in the first area in a preceding frame is maintained, and wherein the scan driver sequentially provides, in the refresh section, the scan signal to only the pixel rows that correspond to the second area.

6. The display device according to claim 5, wherein the driving controller controls, when increasing the driving frequency corresponding to the second area from the first driving frequency to the third driving frequency, the pixel component and the scan driver such that the refresh section is allocated to a first sub-frame, the hold section is allocated to a second sub-frame, and successive images are displayed during the first sub-frame and the second sub-frame.

7. The display device according to claim 6, wherein the scan driver sequentially provides the scan signal to the pixel rows that correspond to the second area among the plurality of pixel rows during the first sub-frame, and thereafter sequentially provides the scan signal to the pixel rows that correspond to the second area among the plurality of pixel rows during the second sub-frame.

8. The display device according to claim 5, further comprising a data driver configured to provide, through a data line connected to each of a plurality of pixel columns each including a plurality of pixels, a data voltage corresponding to the image data to the plurality of pixels in synchronization with the scan signal in each frame, wherein the data driver sequentially provides, in the refresh section, the data voltage corresponding to the image data to only the pixels included in the pixel rows that correspond to the second area.

9. The display device according to claim 7, further comprising a data driver configured to provide, through a data line connected to each of a plurality of pixel columns each including a plurality of pixels, a data voltage corresponding to the image data to the plurality of pixels in synchronization with the scan signal in each frame, wherein the driving controller controls the data driver such that a data voltage corresponding to a first image is provided to the pixels included in the second area in the first sub-frame, and controls the data driver such that a data voltage corresponding to a second image different from the first image and successive to the first image is provided to the pixels included in the second area in the second sub-frame.

10. The display device according to claim 6, wherein, in a first mode for reducing power consumption of the display device, the hold frame determiner further set some of the plurality of frames other than the already set hold frames to additional hold frames so that the driving frequency corresponding to the first area is reduced to a value lower than the second driving frequency.

11. The display device according to claim 10, wherein the driving controller allocates, in a second mode for high speed driving, the refresh section and the hold section included in at least one hold frame among the additional hold frames to the first sub-frame and the second sub-frame, respectively, so that the driving frequency corresponding to the second area is increased to a value higher than the third driving frequency.

12. A method of driving a display device for displaying an image refreshed in each frame based on a preset first driving frequency, the method comprising:

dividing, in a case where image data that is received from an external device and corresponds to a plurality of successive frames includes data corresponding to a static image, a display area included in the display device into a first area in which the static image is displayed, and a second area in which a video is displayed; and driving pixels included in the first area at a second driving frequency less than the first driving frequency, and driving pixels included in the second area at a third driving frequency greater than the first driving frequency, wherein driving the pixels included in the first area and the pixels included in the second area comprises gradually reducing a driving frequency corresponding to the first area from the first driving frequency to the second driving frequency over a first time period, and gradually increasing a driving frequency corresponding the second area from the first driving frequency to the third driving frequency over a second time period.

13. The method according to claim 12, further comprising:

checking whether the image data includes data corresponding to the static image; and determining the driving frequency corresponding to the first area to be the second driving frequency, and determining the driving frequency corresponding to the second area to be the third driving frequency, wherein checking whether the image data includes the data corresponding to the static image comprises generating, in a case where the image data includes the data corresponding to the static image, region information that is information about regions occupied by the first area and the second area in the display area, wherein determining the driving frequency corresponding to the first area and the driving frequency corresponding to the second area comprises determining a driving frequency of each display area in a pixel component included in the display device, based both on whether the image data includes the data corresponding to the static image and on the region information.

14. The method according to claim 13, further comprising setting, in a case whether the image data includes the data corresponding to the static image, some of the plurality of frames to hold frames in each of which an image displayed in the first frame in a preceding frame is maintained without being refreshed.

15. The method according to claim 13, wherein determining the driving frequency corresponding to the first area and the driving frequency corresponding to the second area comprises:

determining a driving frequency corresponding to an entirety of the display area to be the first driving frequency in a case where the image data does not include the data corresponding to the static image; and determining, in a case where the image data includes the data corresponding to the static image, the driving frequency corresponding to the first area of the display area to be the second driving frequency, and determining the driving frequency corresponding to the second area to be the third driving frequency.

16. The method according to claim 12, wherein the driving frequency corresponding to the first area is reduced from the first driving frequency to the second driving frequency by a plurality of steps, and at each step included in the plurality of steps, the driving frequency corresponding to the first area is reduced from a driving frequency determined at a preceding step by a preset step frequency and then is maintained for a preset time, and wherein the driving frequency corresponding to the second area is increased from the first driving frequency to the third driving frequency by a plurality of steps, and at each step included in the plurality of steps, the driving frequency corresponding to the second area is increased from a driving frequency determined at a preceding step by a preset step frequency and then is maintained for the preset time.

17. The method according to claim 14, wherein each of the hold frames includes a fresh section in which the second area is refreshed, and a hold section in which an image displayed in the first area in a preceding frame is maintained, and wherein driving the pixels included in the first area and the pixels included in the second area further comprises sequentially providing, to each of a plurality of pixel rows included in the display area and each including a plurality of pixels, a scan signal for driving the pixels included in the display area in each frame based on the first driving frequency, and wherein providing the scan signal comprises sequentially providing, in a case where the image data includes the data corresponding to the static image, the scan signal to only the pixel rows that correspond to the second area in each frame in the refresh section.

18. The method according to claim 17, wherein driving the pixels included in the first area and the pixels included in the second area further comprises driving, when increasing the driving frequency corresponding to the second area from the first driving frequency to the third driving frequency, the pixels included in the first area and the pixels included in the second area such that the refresh section is allocated to a first sub-frame, the hold section is allocated to a second sub-frame, and successive images are displayed during the first sub-frame and the second sub-frame.

19. The method according to claim 18, wherein providing the scan signal comprises sequentially providing the scan signal to the pixel rows that correspond to the second area among the plurality of pixel rows during the first sub-frame, and then sequentially providing the scan signal to the pixel rows that correspond to the second area among the plurality of pixel rows during the second sub-frame.

20. The method according to claim 19, wherein driving the pixels included in the first area and the pixels included in the second area further comprises providing, through a data line connected to each of a plurality of pixel columns each including a plurality of pixels, a data voltage corresponding to the image data to the plurality of pixels in synchronization with the scan signal in each frame, and wherein providing the data voltage comprises providing a data voltage corresponding to a first image to the pixels included in the second area in the first sub-frame, and providing a data voltage corresponding to a second image different from the first image and successive to the first image to the pixels included in the second area in the second sub-frame.

21. A driving controller configured to control an operation of driving a display device at a first driving frequency based on image data that is received from an external device and corresponds to a plurality of frames, the driving controller comprising:

a static image detector configured to generate, in a case where the image data includes data corresponding to a static image, region information that is information about regions occupied by a first area and a second area of a display area of the display device, the first area being provided to display the static image, and the second area being provided to display a video;

a frequency determiner configured to determine, based on the region information, a driving frequency of the first area to be a second driving frequency lower than the first driving frequency, and determine a driving frequency of the second area to be a third driving frequency higher than the first driving frequency; and a control signal generator configured to generate a control signal for controlling the display device such that, based on the determined frequency information, a driving frequency corresponding to the first area is gradually reduced from the first driving frequency to the second driving frequency over a first time period, and a driving frequency corresponding to the second area is gradually increased from the first driving frequency to the third driving frequency over a second time period.

22. The driving controller according to claim 21, further comprising a hold frame determiner configured to set, based on the determined frequency information, some of the plurality of frames to hold frames in each of which an image displayed in the first area in a preceding frame is maintained without being refreshed.

* * * * *